United States Patent [19]
Takigawa et al.

[11] Patent Number: 5,635,844
[45] Date of Patent: Jun. 3, 1997

[54] OBJECT SENSING APPARATUS USING PREDICTING MEANS FOR DETERMINING IF THE OBJECT IS A GUARDRAIL

[75] Inventors: Yoshifumi Takigawa; Hiroshi Ukawa; Masaaki Minamino, all of Fujisawa, Japan

[73] Assignee: Isuzu Motors Limited, Tokyo, Japan

[21] Appl. No.: 428,436

[22] Filed: Apr. 25, 1995

[51] Int. Cl.$^6$ ................................................. G01R 27/04
[52] U.S. Cl. ................................................. 324/642
[58] Field of Search ................................ 324/642, 109, 324/114, 128; 342/70, 109, 130, 458

[56] References Cited

U.S. PATENT DOCUMENTS

| | | | |
|---|---|---|---|
| 3,633,204 | 1/1972 | Earp et al. | 342/458 |
| 4,079,377 | 3/1978 | Heiden et al. | 342/109 |
| 5,220,331 | 6/1993 | Gunter | 342/70 |

*Primary Examiner*—Sandra L. O'Shea
*Assistant Examiner*—Roger Phillips

[57] ABSTRACT

An obstacle sensing apparatus uses an FM-CW wave as an emitted wave to an object in front of a car. A received wave from the object is mixed with the emitted wave to produce a beat signal which is analyzed in frequency to measure a distance and a relative speed with respect to the object. A distance and a relative speed at the next time is predicted from the measured distance and relative speed. The object is determined to be a car if the relative speed does not have an approaching direction or substantially the same value as a sensed car speed. The object is otherwise determined to be at least one of a guardrail and a sound barrier if a difference between the measured distance and the predicted distance exceeds a preset value and a plurality of the last measured distances are substantially constant. The object is otherwise determined to be a stationary object other than the guardrail.

9 Claims, 12 Drawing Sheets

FIG. 12A: MEASURED VALUES

| MEASURED OBJECT / MEASUREMENT TIMES | NEAR | | MIDDLE | | FAR | |
|---|---|---|---|---|---|---|
| | DISTANCE | RELATIVE SPEED | DISTANCE | RELATIVE SPEED | DISTANCE | RELATIVE SPEED |
| 1 | 40 △ | -72 | 42 ○ | -72 | 44 | 0 |
| 2 | 40 △ | -72 | 40 ○ | -72 | 44 | 0 |
| 3 | 38 △ | -72 | 38 ○ | -72 | 44 | 0 |
| 4 | 36 ○ | -72 | 38 △ | -72 | 44 | 0 |
| 5 | 34 ○ | -72 | 40 △ | -72 | 44 | 0 |

FIG. 12B: PREDICTED VALUES

| MEASURED OBJECT / MEASUREMENT TIMES | PREDICTION ① | | PREDICTION ② | | PREDICTION ③ | |
|---|---|---|---|---|---|---|
| | DISTANCE | RELATIVE SPEED | DISTANCE | RELATIVE SPEED | DISTANCE | RELATIVE SPEED |
| 1 | X | X | X | X | X | X |
| 2 | 38 | -72 | 40 | -72 | X | X |
| 3 | 38 | -72 | 38 | -72 | 44 | 0 |
| 4 | 36 | -72 | 36 | -72 | 44 | 0 |
| 5 | 34 | -72 | 36 | -72 | 44 | 0 |

○ : JUDGED AS STATIONARY OBJECT
△ : JUDGED AS GUARDRAIL (NOTE) : SPEED=km/h
DISTANCE=m
$\Delta \tau$=0.1(sec.),
NEGATIVE POLARITY OF RELATIVE SPEED
= APPROACHING DIRECTION

FIG. 13

| MEASUREMENT TIMES | MEASURED VALUES | | PREDICTED VALUES | | CALCULATING EQUATION | |
|---|---|---|---|---|---|---|
| | DISTANCE | RELATIVE SPEED | DISTANCE | RELATIVE SPEED | DISTANCE | RELATIVE SPEED |
| 0 | $r_0$ | $v_0$ | NOT APPLICABLE | NOT APPLICABLE | $r_{1e} = r_0 + v_0 \cdot \Delta t$ | NOT APPLICABLE |
| 1 | $r_1$ | $v_1$ | $r_{1e}$ | $v_{1e}$ | $r_{2e} = r_1 + v_1 \times \Delta t$ | $v_{2e} = 2v_1 - v_0$ |
| 2 | $r_2$ | $v_2$ | $r_{2e}$ | $v_{2e}$ | $r_{3e} = r_2 + v_2 \times \Delta t$ | $v_{3e} = 2v_2 - v_1$ |
| 3 | $r_3$ | $v_3$ | $r_{3e}$ | $v_{3e}$ | $r_{4e} = r_3 + v_3 \times \Delta t$ | $v_{4e} = 2v_3 - v_2$ |
| 4 | $r_4$ | $v_4$ | $r_{4e}$ | $v_{4e}$ | $r_{5e} = r_4 + v_4 \times \Delta t$ | $v_{5e} = 2v_4 - v_3$ |
| 5 | $r_5$ | $v_5$ | $r_{5e}$ | $v_{5e}$ | $r_{6e} = r_5 + v_5 \times \Delta t$ | $v_{6e} = 2v_5 - v_4$ |
| ...... | | | | | | |

GENERAL EQUATION $$\begin{cases} r_{e\,i+1} = r_i + v_i \cdot \Delta t \\ v_{e\,i+1} = v_i + \dfrac{v_i - v_{i-1}}{\Delta t} \cdot \Delta t \\ \qquad\;\; = 2v_i - v_{i-1} \end{cases}$$

F I G. 1 4

| MEASURED OBJECT / MEASUREMENT TIMES | GUARDRAIL | | STATIONARY OBJECT | | CAR | |
|---|---|---|---|---|---|---|
| | DISTANCE | RELATIVE SPEED | DISTANCE | RELATIVE SPEED | DISTANCE | RELATIVE SPEED |
| 1 | 40 | −72 | 42 | −72 | 44 | 0 |
| 2 | 40 | −72 | 40 | −72 | 44 | 0 |
| 3 | 38 | −72 | 38 | −72 | 44 | 0 |
| 4 | 38 | −72 | 36 | −72 | 44 | 0 |
| 5 | 40 | −72 | 34 | −72 | 44 | 0 |

OBJECT SENSING APPARATUS USING PREDICTING MEANS FOR DETERMINING IF THE OBJECT IS A GUARDRAIL

BACKGROUND OF THE INVENTION

1. Field of the Invention

The present invention relates to an obstacle sensing apparatus, and in particular to an apparatus using an FM-CW wave for sensing whether or not an object reflecting the FM-CW wave is an obstacle by measuring a distance and a relative car speed with respect to a car in front.

2. The Related Art

Figure 1:
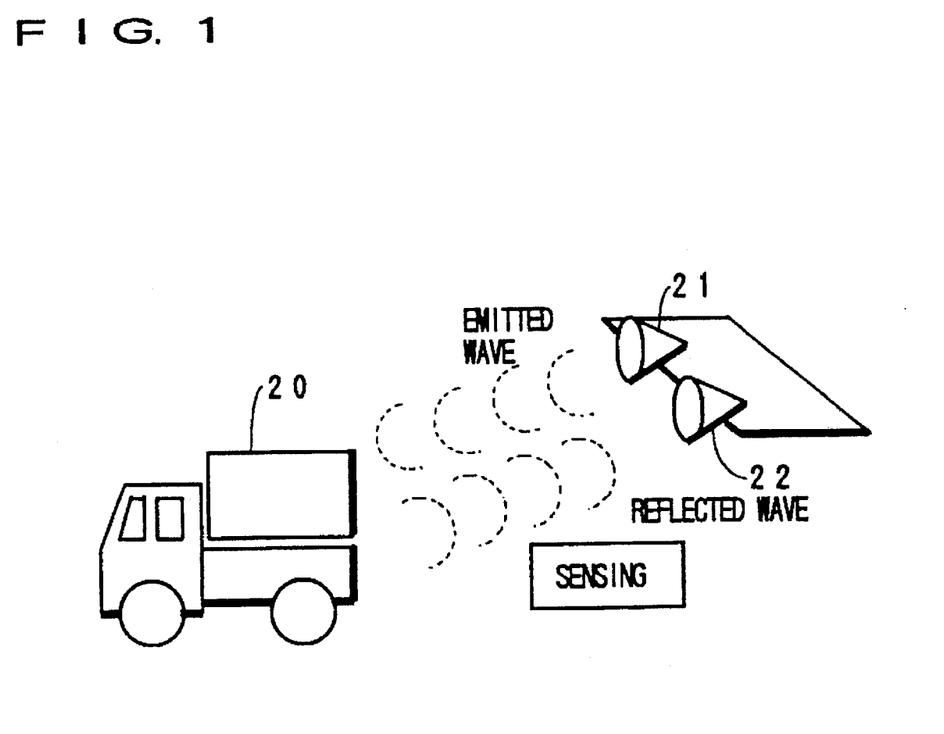
FIG. 1 is a schematic diagram showing a generally known obstacle sensing apparatus using an FM-CW wave.
Figure 2:
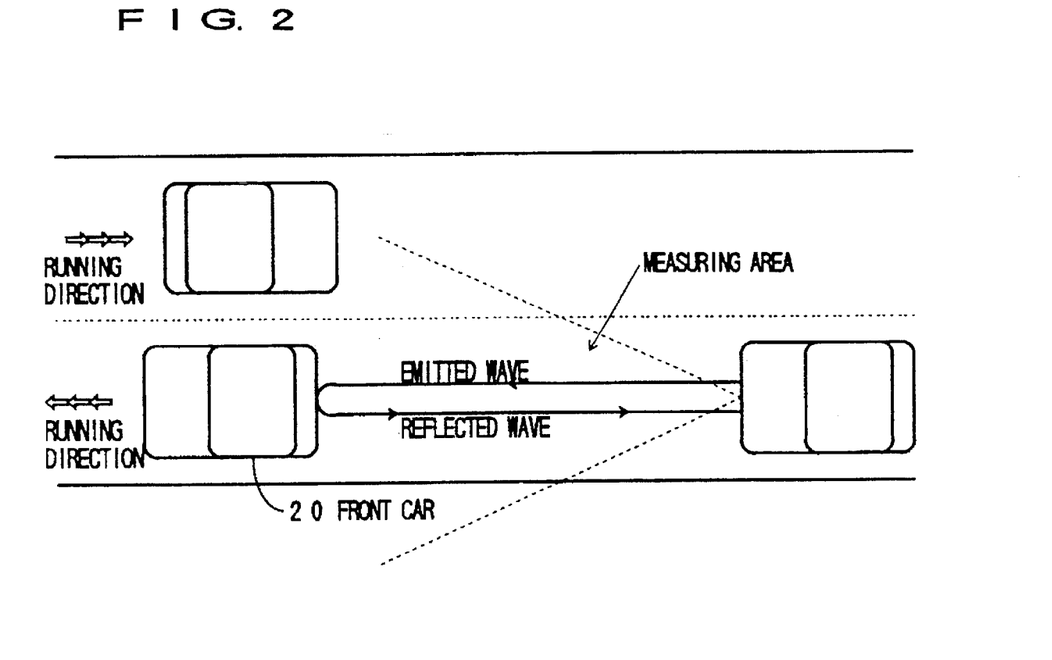
FIG. 2 is a plan view of the obstacle sensing apparatus shown in FIG. 1.

FIG. 1 schematically shows a well-known obstacle sensing apparatus using an FM-CW wave, and FIG. 2 shows in plan a relationship between a car mounting the obstacle sensing apparatus and a front car.

In FIGS. 1 and 2, the FM-CW wave emitted or transmitted from a radio (electromagnetic) wave transmitting device 21 is reflected from the front car 20 and is received at a radio wave receiving device 22. Those devices 22 and 21 are incorporated in a radar sensor.

The transmitted wave and the received wave are mixed in a mixer (not shown) to produce a beat frequency therebetween which is used for measurement of a distance between cars and a relative car speed with respect to the front car 20. It is to be noted that "car speed" will be hereinafter simply referred to as —speed—.

Figures 3A, 3B:
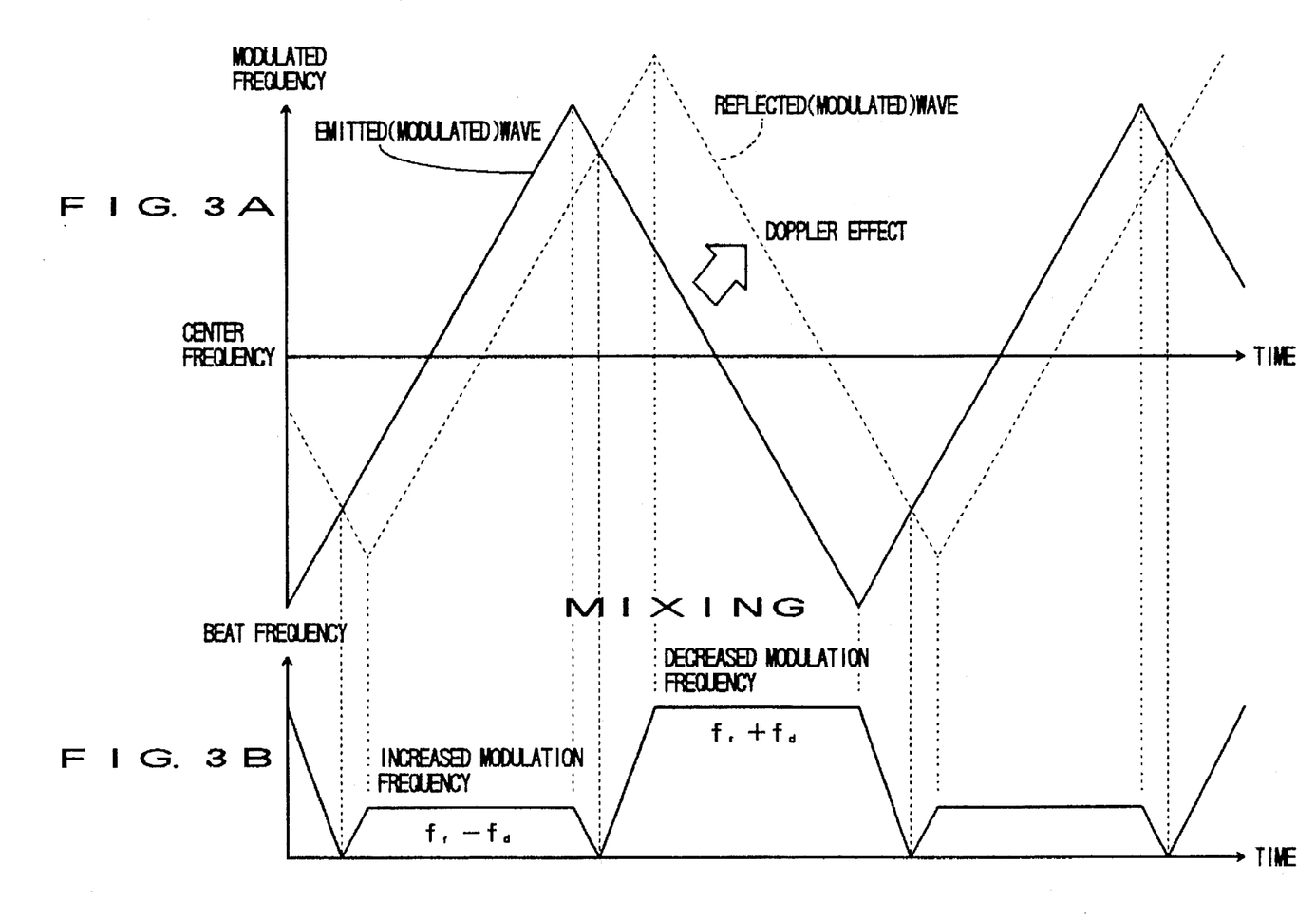
FIGS. 3A and 3B are diagrams of transmitting/receiving waveforms used for the present invention and the prior art.

FIG. 3A and 3B show a waveform of the mixed wave, in which a solid line in FIG. 3A shows the transmitted wave which is a frequency-modulated radio wave in the form of a triangle.

The transmitted wave is reflected by a radio wave reflecting object such as a car and turns into a received wave changed in frequency as shown by dotted lines due to Doppler effect if the object is moving.

By mixing those waves, a waveform of a beat frequency signal as shown in FIG. 3B can be obtained. The beat frequency $f_b$ is given by the sum or difference of a distance frequency $f_r$ and a speed frequency $f_b$ respectively corresponding to a distance and a relative speed with respect to the radio reflecting object according to the following principle equation:

$$f_b = (4 \Delta f f_m/C) R \pm (2 f_c/C) V \quad (1)$$

where

V: Relative speed (m/sec) of the reflecting object to the radar sensor;

R: Distance (m) to the reflecting object from the radar sensor;

C: Light velocity (m/sec);

$\Delta f$; Frequency modulation width (Hz);

$f_m$; Modulation frequency (Hz);

$f_c$; Radar carrier frequency (Hz).

Now assuming that the beat frequency of the increased modulation frequency is $f_{up}$ and the beat frequency of the decreased modulation frequency be $f_{dn}$, the following equation is given:

$$f_r = 0.5 \ (f_{up} + f_{dn})$$

$$f_d = 0.5 \ (f_{up} - f_{dn}) \quad (2)$$

From Equations (1) and (2), the following equation is obtained:

$$V = (C/2 f_c) f_d$$

$$R = (C/4 \Delta f f_m) f_r \quad (3)$$

From Equation (3), the distance R and the relative speed V with respect to the reflecting object which is a front car can be determined.

Figure 4:
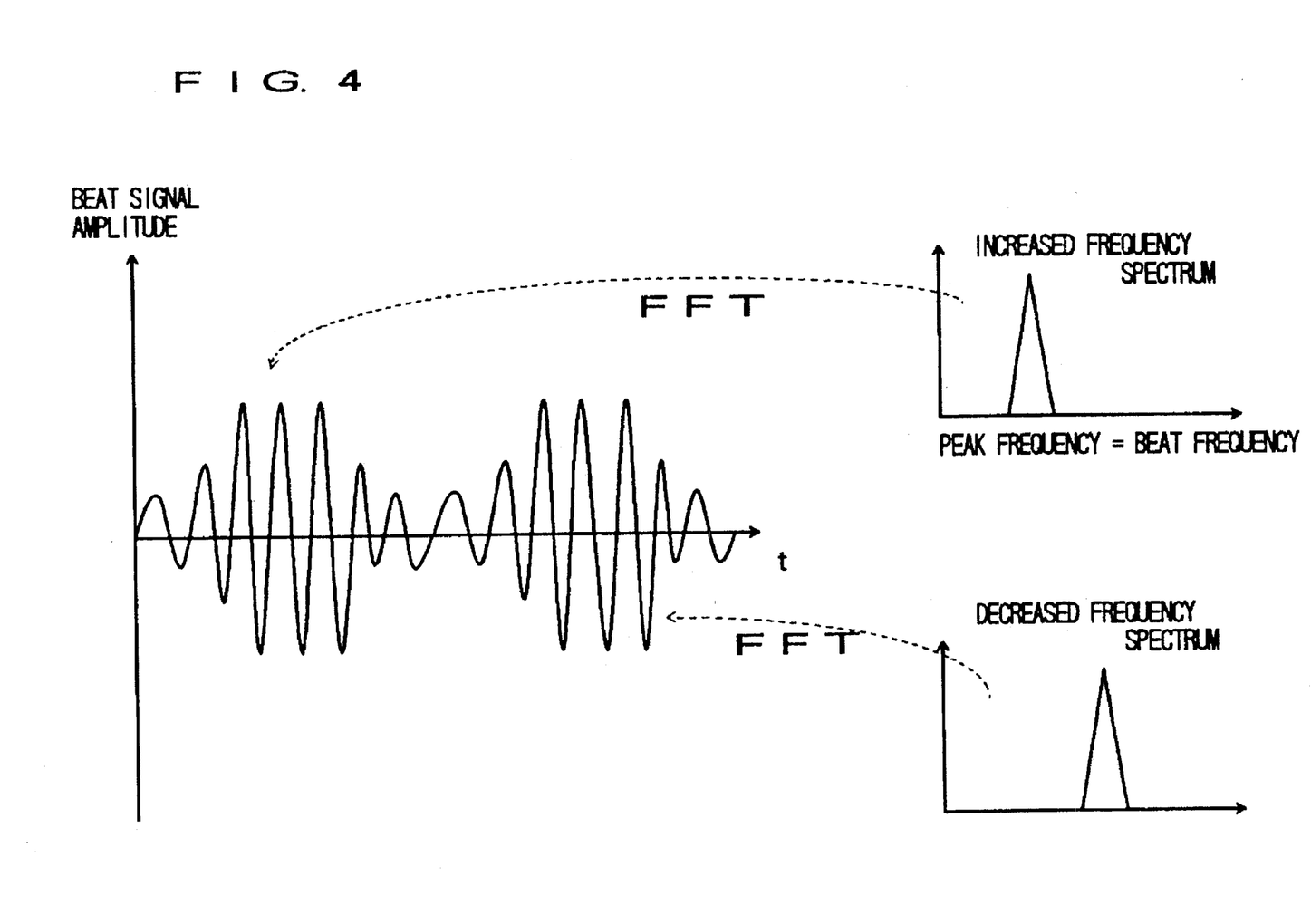
FIG. 4 is a spectrum waveform diagram of modulated frequency.

This FM-CW type obstacle sensing apparatus carries out frequency analysis for the beat signal of the transmitted wave and the received wave. The frequency analysis means, as shown in FIG. 4, that the increased portion and the decreased portion of the beat frequency in the frequency modulated wave are respectively subject to FFT (Fast Fourier Transform) to determine a frequency peak position corresponding to a relative speed and a distance with respect to a radio wave reflecting object such as a car. The combination of the peaks of the increased and decreased frequency portions of the modulated wave is then found out to calculate the distance from and the relative speed of the radio reflecting object from the above Equations (1)–(3).

In the nature of a radio wave, however, if there is a radio wave reflecting object other than a car, the reflected wave from the object cannot be distinguished from a reflected wave from a car whereby the object must be judged as a car, resulting in erroneous information or an erroneous alarm for a driver.

Figure 5A:
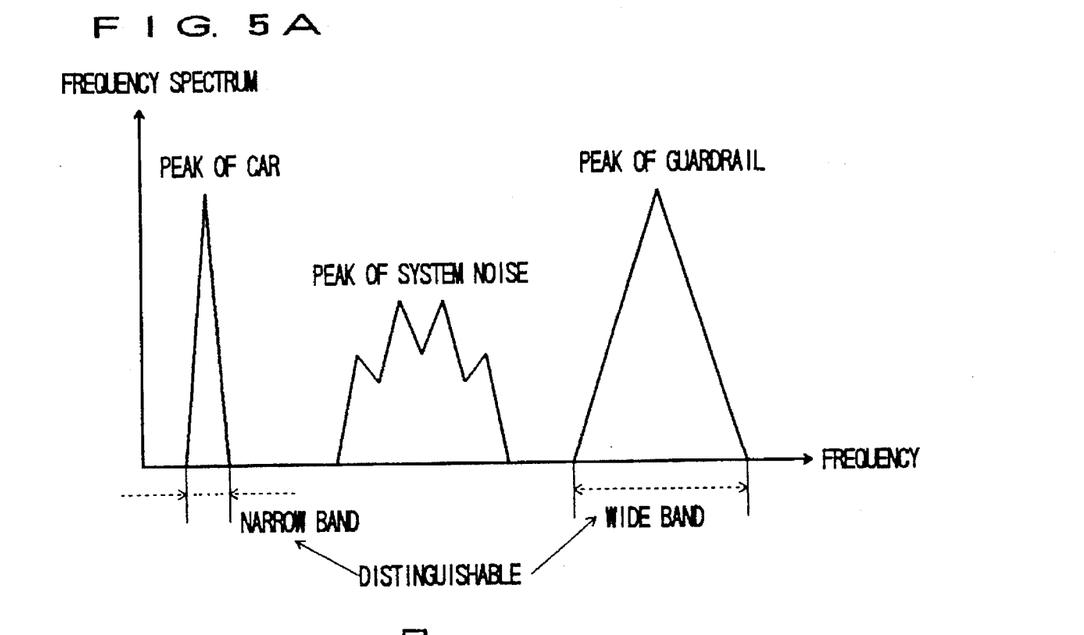
FIGS. 5A and 5B are diagrams for describing disadvantages of the prior art.

For the solution of this problem, as shown in FIG. 5A, there has been proposed a prior art apparatus in which a radio wave reflecting off an object such as a guardrail or a sound barrier other than a car is recognized upon frequency analysis by detecting frequency peak configurations and particularly by detecting that a frequency band width of the frequency peak is narrower for the car.

However, this prior art apparatus has a radio wave measuring portion which is affected by system noise. Particularly, when frequency peaks of such system noise are superposed with frequency peaks for a car, the band width of the frequency peak of the car is substantially widened, so that whether or not the object is a car can not be decided.

Namely, referring to FIG. 5A, if a frequency peak with respect to a reflecting object such as a car, a frequency peak with respect to a stationary object such as a guardrail or a sound barrier, and system noise peaks are separated from each other in terms of frequency, it will be possible to distinguish a car from a stationary object on the basis of the band widths of the peak frequencies.

Figure 5B:
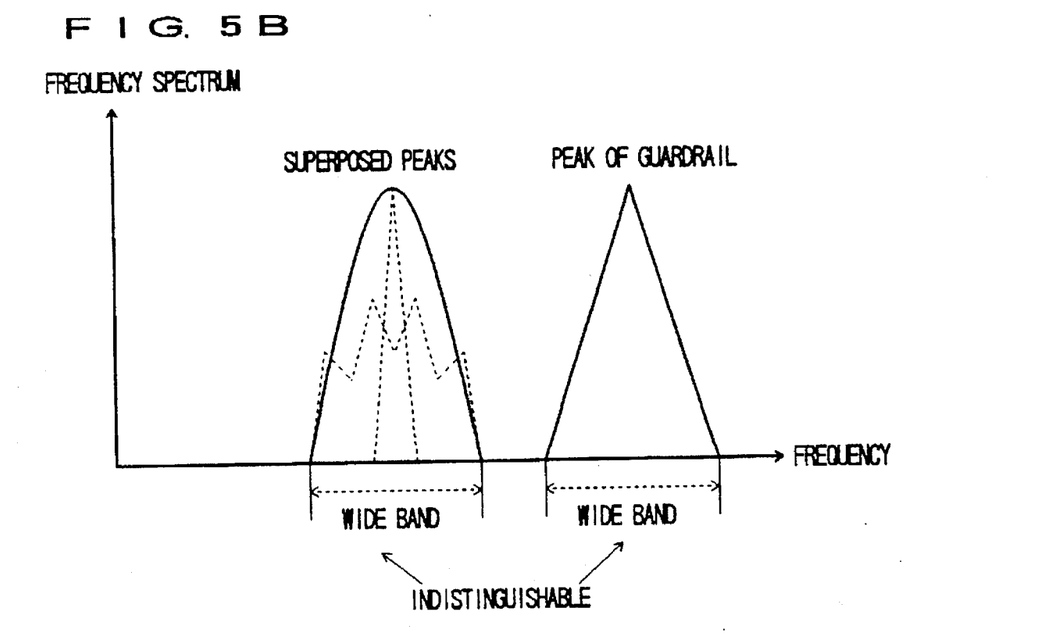

However, as shown by dotted lines in FIG. 5B, when the level of system noise is increased due to thermal characteristics of the system, the frequency band is correspondingly widened while at the same time the peak frequency of a car is shifted in response to the movement of a car, the noise peak and the peak of a car can be superposed in terms of frequency. Therefore, the band width of the superposed peak is widened, which prevents distinguishing between a car and a guardrail.

SUMMARY OF THE INVENTION

It is an object of the present invention to provide an apparatus for sensing an obstacle wherein an FM-CW wave is emitted, a received wave from an object reflecting the FM-CW wave is mixed with the emitted wave to produce a beat signal which is analyzed in frequency to measure a distance and a relative speed with respect to the object, the apparatus being capable of distinguishing a car from a stationary object such as a guardrail or sound barrier or the like without any interference due to system noise or the like.

Figure 6:
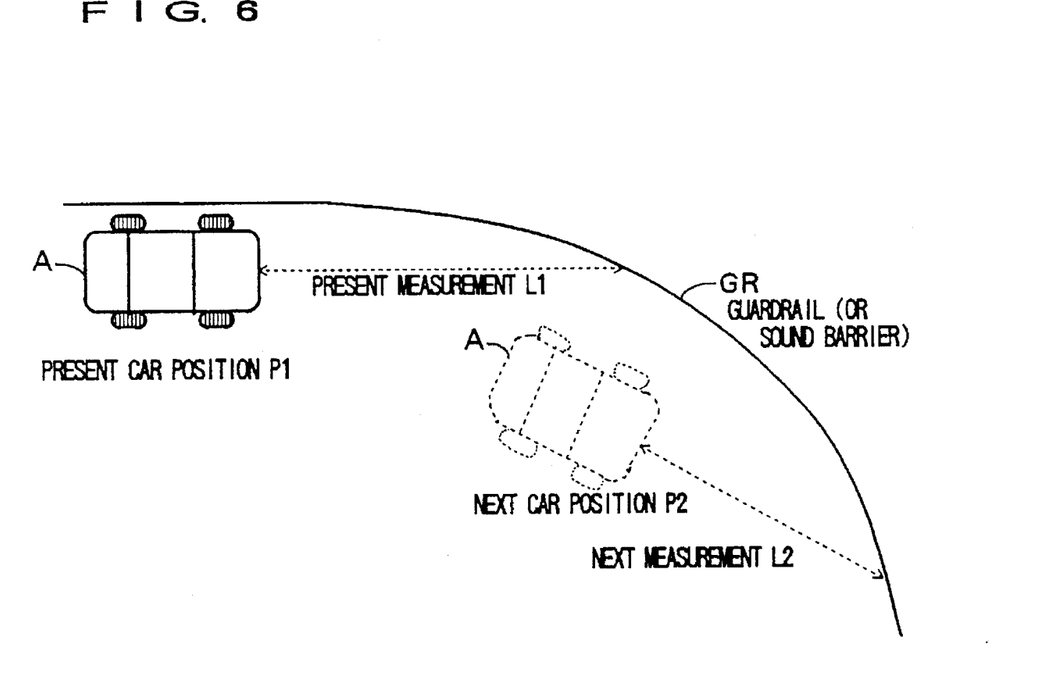
FIG. 6 is a diagram for describing the operation of the obstacle sensing apparatus according to the present invention when a car runs in a curved corner of a guardrail.

Referring to FIGS. 6–9, it is to be noted, as shown in FIG. 6, that a guardrail GR (or a sound barrier) is "a stationary object" with respect to a concerned car A, hereinafter referred to as a sensing car transmitting an FM-CW wave. Therefore, relative speed measured per a constant period while the sensing car A is running is to have the same value as the sensing car A and has an approaching direction to the sensing car A.

Namely, if it is actually found that a relative speed as measured has substantially the same value as the sensing car A and has an approaching direction to the sensing car A, it can be determined that such a radio wave reflecting object is not a car but a stationary object or otherwise is a car.

Figure 7:
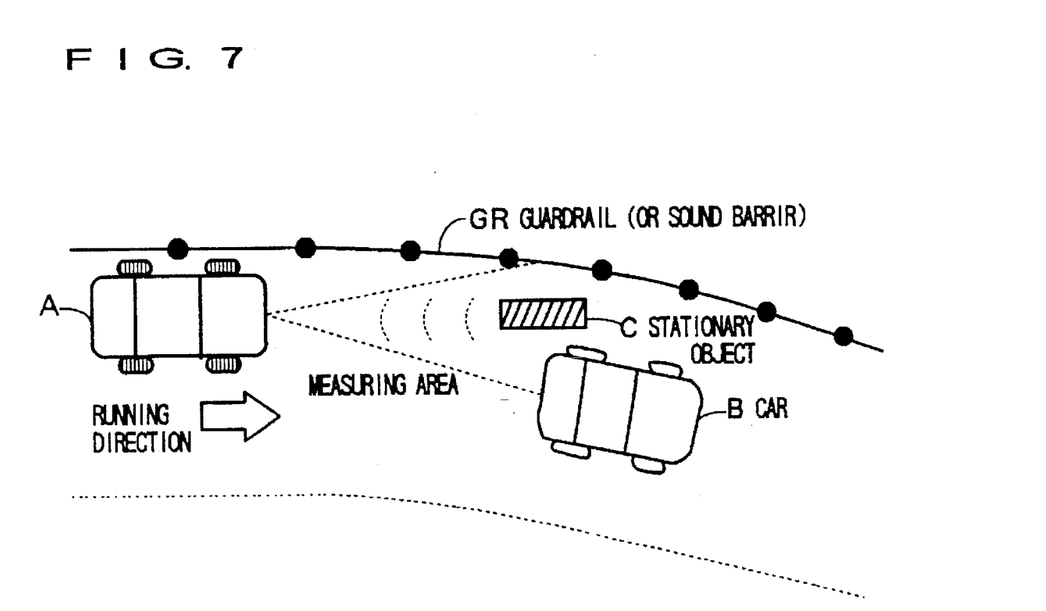
FIG. 7 is a diagram for illustrating a measuring example in the obstacle sensing apparatus according to the present invention.

Since the stationary object can include a stationary object C other than the guardrail GR shown in FIG. 7, both of the stationary objects are required to be distinguished from each other.

It is to be noted but the running direction of the sensing car A is always tangential with respect to a corner curve of the guardrail GR.

Therefore, from geometric relationship, measurement L1 in FIG. 6 showing a distance from the sensing car A to the guardrail GR at the present car position P1 is the same as measurement L2 of the distance at the next car position P2 (L1=L2).

Figure 8:
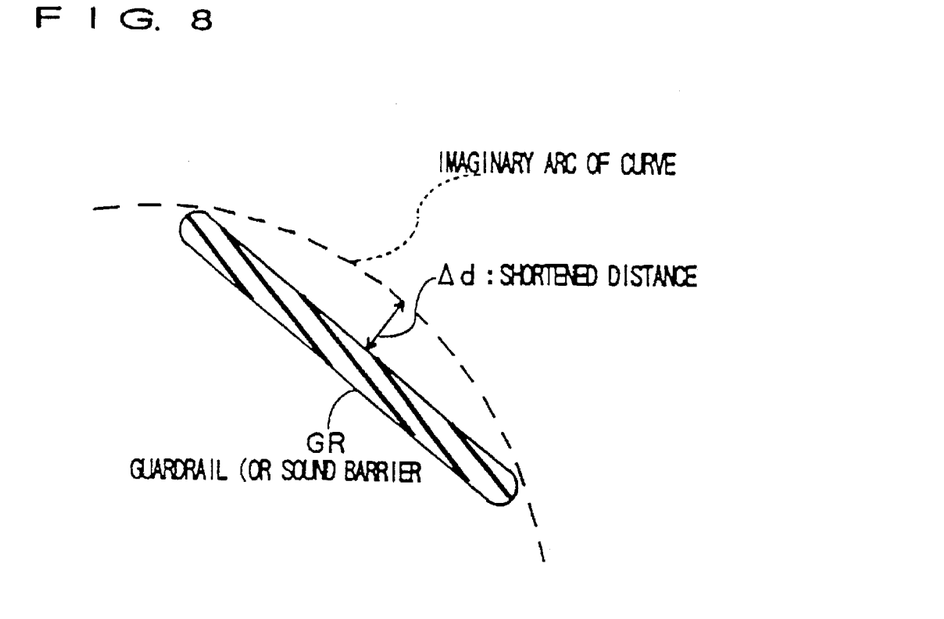
FIG. 8 is a diagram showing an actual guardrail portion for describing the principle of the obstacle sensing apparatus according to the present invention.

While the guardrail GR (or sound barrier) shown in FIG. 6 macroscopically depicts an ideal arc, it is microscopically formed of the combination of short straight lines as shown in FIG. 7. In each of the short straight lines, as shown in FIG. 8, the ideal arc of the guardrail GR (or sound barrier) is farther by $\Delta d$ than the guardrail GR itself.

Figure 9:
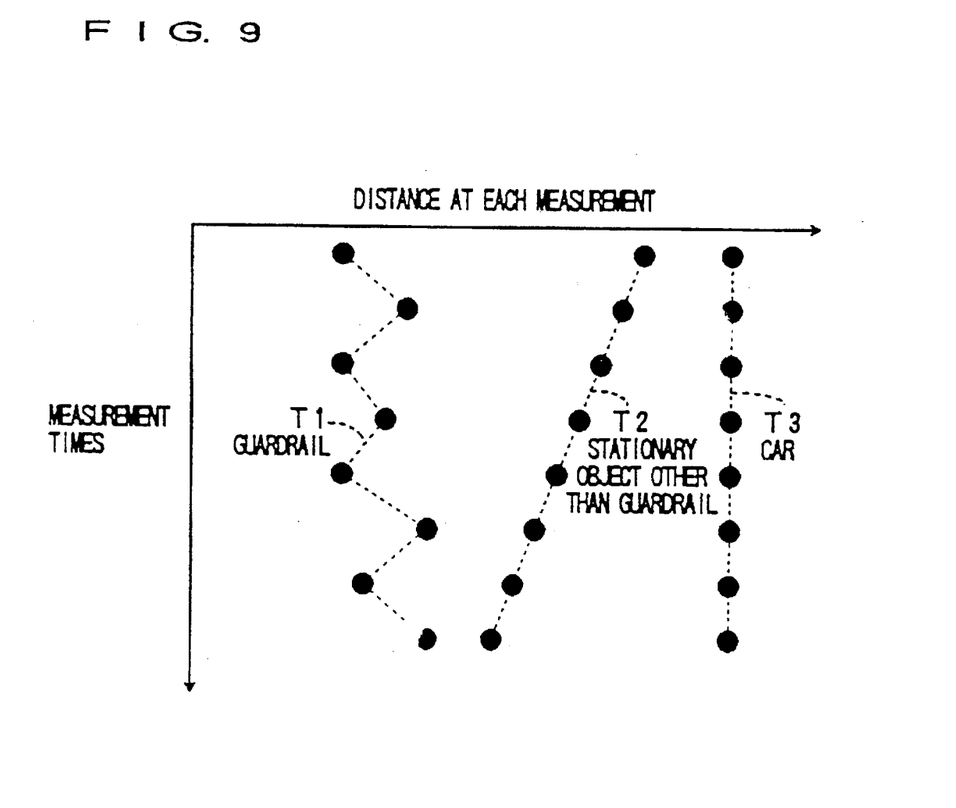
FIG. 9 is a graph showing some traces of measured distances in the obstacle sensing apparatus according to the present invention.

Therefore, as shown in FIG. 9, a trace T1 of the distance between the sensing car A and the guardrail GR at each of the measurements oscillates within a predetermined small area because distance measurements obtained every predetermined period by the above radar principle Equation (1) are different from each other.

The guardrail GR is a kind of stationary object and is required to be further distinguished from the stationary object C shown in FIG. 7. The stationary object C has a trace T2 in which the measured distances thereto are getting shorter and shorter and is different in characteristic from the guardrail GR which substantially indicates the same value when averaged in the trace T1 along the number of measuring times although the measurements oscillate. A front car B provides a trace T3 if it runs in a similar speed to the sensing car A.

In consideration of the above view point, it will be possible to distinguish between a car, a guardrail (or sound barrier) and a stationary object from a mutual relationship of predicted information from measured information obtained by some observations with the measured information.

Accordingly, the present invention comprises means for sensing an actual car speed, and means for predicting a distance and a relative speed at the next time from the measured distance and relative speed and for determining the object as a stationary object if the measured relative speed has substantially the same value as the sensed car speed in an approaching direction.

The present invention further comprises means for determining the object as a car if the measured relative speed does not have substantially the same value as the sensed car speed or does not include an approaching direction.

The present invention further comprises means for determining the stationary object as a stationary object other than at least one of a guardrail and a sound barrier if a difference between the measured distance and the predicted distance is less than a preset value.

The present invention further comprises means for determining the stationary object as at least one of a guardrail and a sound barrier if a difference between the measured distance and the predicted distance exceeds a preset value and a plurality of the measured distances in the past are substantially the same.

The present invention further comprises means for storing the measured distance and relative speed and the predicted distance and relative speed, the determining means reading out the stored data in the storing means.

The storing means stores a relative speed and a distance with respect to the reflecting object, which are the last measurements. The last measured relative speed and distance are used for predicting the next relative speed and distance.

It is firstly determined whether or not the predicted relative speeds as stored are the same as an actual speed of the sensing car A in the approaching direction. If not, it will be determined that the reflecting object is a front car as shown by the trace T3 in FIG. 9.

If it is found that the predicted relative speeds are substantially the same as the actual speeds of the sensing car A, it will be further determined whether or not the predicted distances are different by a fixed value or more from each of the measured distances. If not, it is found that the reflecting object is a stationary object other than the guardrail GR as shown by the trace T2 in FIG. 9.

If it is found that the measured distances are different by a fixed value or more from each of the predicted distances, it will be further determined whether or not a plurality of measured distances in the past are substantially the same in order to determine whether or not the measured distances oscillate as shown by the trace T1 in FIG. 9. If it is found that they are the same, it is determined that the reflecting object is a guardrail as a stationary object.

Thus, the present invention stores each of the measurements for distinguishing a car from a stationary object based on a relationship between the measured relative speed and actual speed, and distinguishes a guardrail (or sound barrier) over other stationary objects by obtaining correlation of a plurality of measured distances.

As above described, in the present invention, by using the correlation between the presently predicted value and the plural measurements in the past, it is possible to distinguish between a car, a guardrail, and a stationary object other than the guardrail without any influence of system noise.

Also, for alarm operation with such decided results, error alarms can be reduced, and more accurate alarm operation can be made.

DETAILED DESCRIPTION OF THE PREFERRED EMBODIMENT

Figure 10:
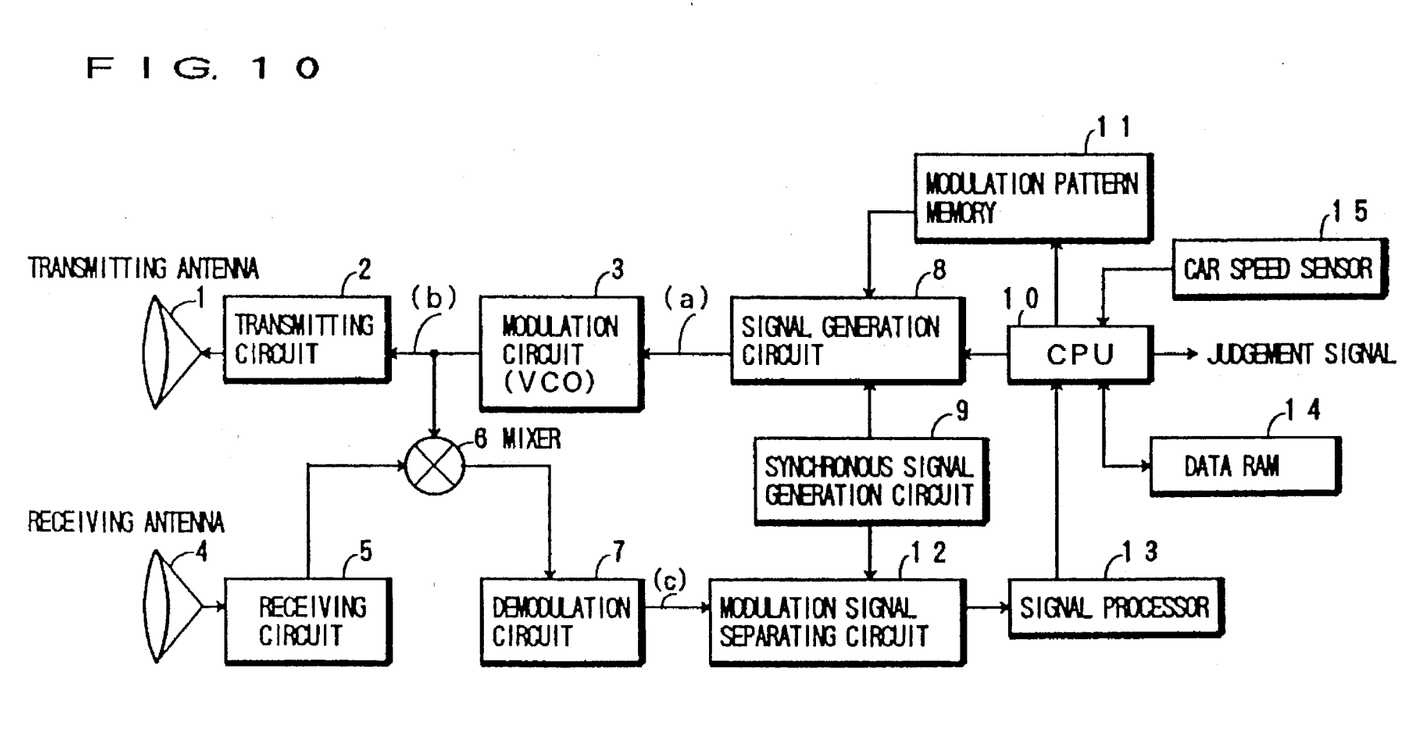
FIG. 10 is a block diagram showing one embodiment of the obstacle sensing apparatus according to the present invention.

FIG. 10 shows one embodiment of an obstacle sensing apparatus according to the present invention in the form of a block diagram, in which a transmitting antenna 1 is connected to a transmitting circuit 2 which is further connected to a modulation circuit 8 including VCO (Voltage Controlled Oscillator) whereby a modulated signal from the modulation circuit 3 is transmitted through the transmitting circuit 2 from the transmitting antenna 1.

A receiving antenna 4 is connected to a receiving circuit 5 which is further connected to a mixer 6 whereby a received signal received by the receiving antenna 4 through the receiving circuit 5 is mixed with the modulated signal from the modulation circuit 3 at the mixer 6.

It is to be noted that the transmitting circuit 2 and the modulation circuit 8 form the radio transmitting device 21 as shown in FIG. 1 and the receiving circuit 5 corresponds to the radio wave receiving device 22.

A signal for the modulation circuit 8 is produced by a signal generation circuit 8 which always receives a clock signal from a synchronous signal generation circuit 9 and also receives modulation patterns formed of triangle portions and straight line portions stored in a modulation pattern memory 11 comprising RAM or ROM to produce a modulated wave as shown in FIG. 3A.

The output signal of the mixer 6 is provided for a demodulation circuit 7 the output signal of which is provided for a demodulation signal separating circuit 12 for signal separation. The output signal of the demodulation signal separating circuit 12 is provided in the form of digital signal for a signal processor 13 which also serves as a frequency analyzer which provides analyzed results for a CPU 10 as a decision portion which provides decision output signals. The demodulation signal separating circuit 12 also receives a synchronous signal from the syncronous signal generation circuit 9.

A data memory 14 stores data as measured and data predicted by the CPU 10. The CPU 10 receives as an input an actual speed of a car sensed by a speed sensor 15.

Figure 11:
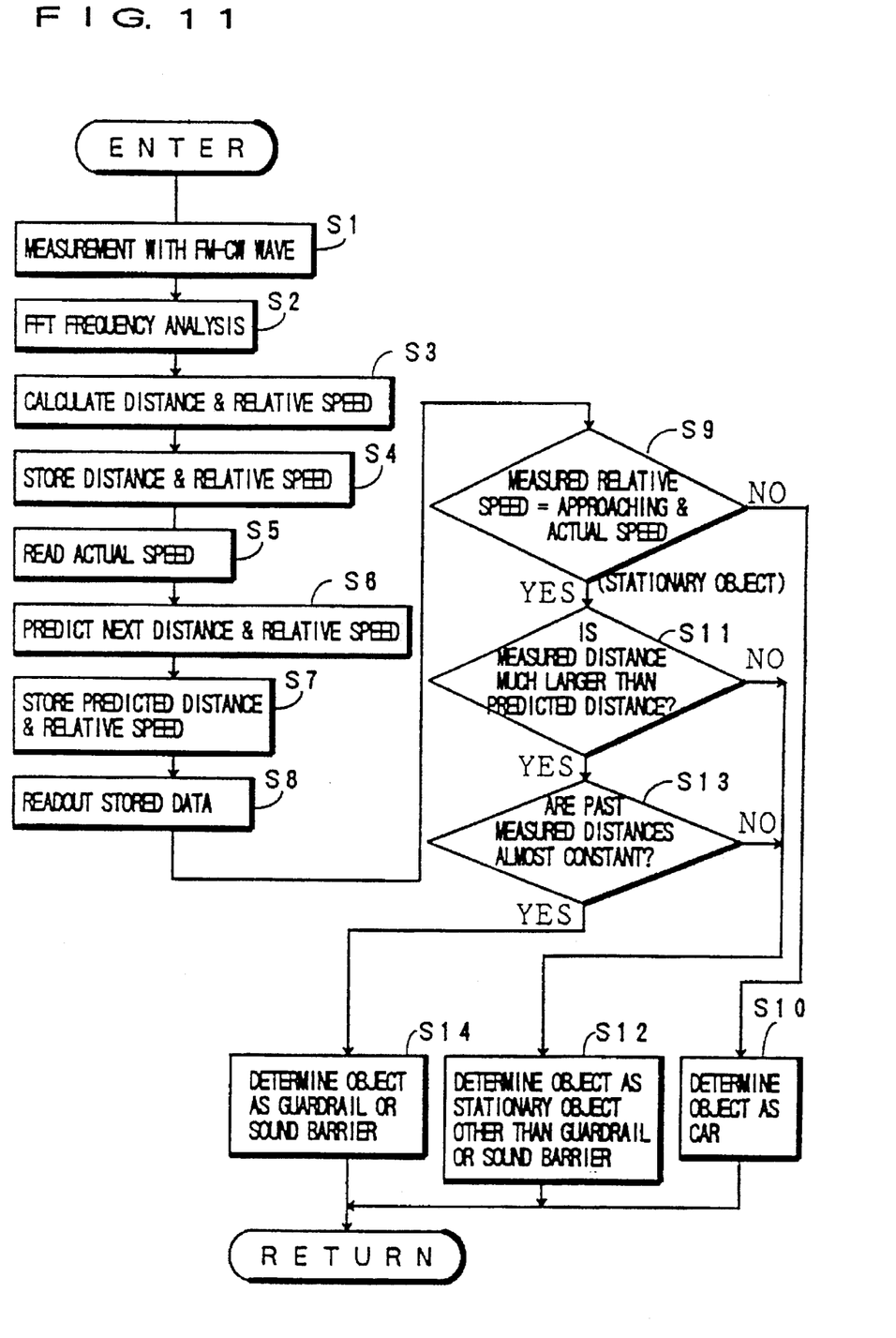
FIG. 11 is a flow chart of an obstacle sensing process executed by a CPU used in the obstacle sensing apparatus according to the present invention.

The operation of the above embodiment will now be described hereinafter with reference to a flow chart as shown in FIG. 11.

Step S1

First of all, the CPU 10 instructs the modulation pattern memory 11 to provide as an output a modulated pattern. The memory 11 provides data of a modulation signal for the signal generation circuit 8 as shown in FIG. 3.

In response, the signal generation circuit 8 converts the modulation signal data into an analog signal (a) and sends it to the modulation circuit (VCO) 3. The modulation circuit 3 also converts the analog signal (a) into a frequency-modulated signal (b) in the form of a triangle which is transmitted through the transmitting circuit 2 from the transmitting antenna 1. It is to be noted that such a modulated pattern may be programmable variable data by the CPU 10.

A received wave at the receiving antenna 4 is converted into a corresponding electrical signal by the receiving circuit 5 which is then mixed with the transmitted wave at the mixer. The mixed signal is provided for the modulation circuit 7 and then converted into a beat signal (c).

The beat signal (c) is provided for the demodulation signal separating circuit 12 which separates the beat signal (c) into increased and decreased frequency signal portions as shown in FIG. 3B on the basis of the synchronous signal out of the synchronous signal generation circuit 9. The data for the modulation signal is provided for the signal processor 13.

Step S2

The signal processor 13 performs FFT operation for the increased and decreased frequency portions of the beat signal so that spectrum peaks exist in the frequencies corresponding to a distance and a relative speed with respect to a front obstacle as shown in FIG. 4.

Step S3

By substituting the increased beat frequency $f_{up}$ and the decreased beat frequency $f_{dn}$ of the demodulated signal subject to FFT analysis in the signal processor 13 into Equation (2), the distance frequency $f_r$ and the relative speed frequency $f_d$ can be calculated so that relative speed V and distance R of the radio wave reflecting object can be obtained from Equations (1) and (2).

Figure 12A:
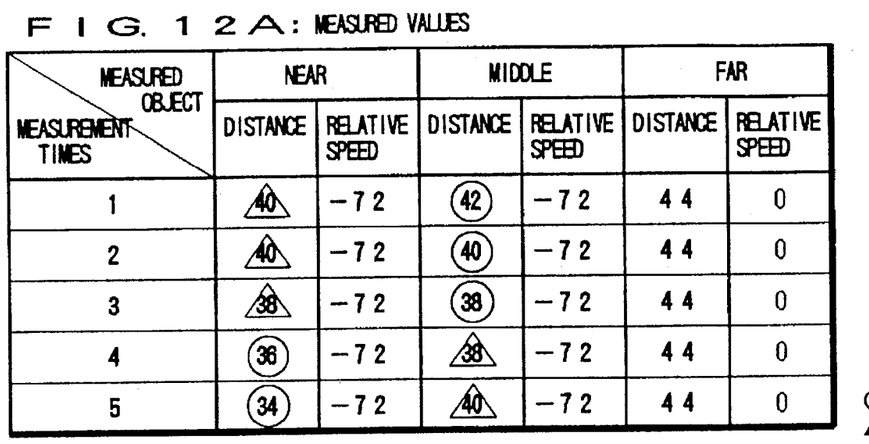
FIGS. 12A and 12B are charts presenting measured values and predicted values in the obstacle sensing apparatus according to the present invention.
Figure 12B:
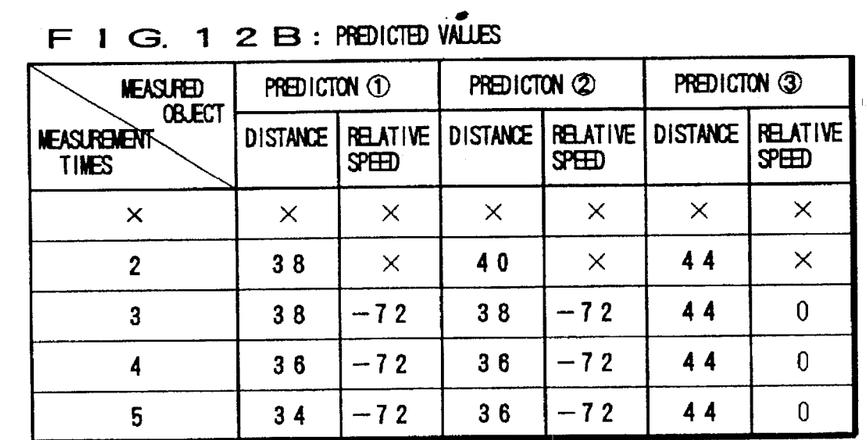

The relative speed V and the distance R thus obtained are charted in FIGS. 12A and 12B in the form of data over "five times of measurements". While an object to be sensed may comprise "car", "guardrail (or sound barrier)", or "stationary object" as shown in FIG. 7, the reason why the measured data are separated into "near", "middle", or "far" in FIG. 12A is that since the FM-CW system provides a relative speed and distance of a plurality of obstacles at the same time by one measurement, what the reflecting object is can not be distinguished without modifying the measured data.

Step S4

The CPU 10 stores the presently measured data of the relative speed and the distance calculated at Step S3 in the memory 14.

Step S5

The CPU 10 also reads-in a car speed signal from the speed sensor 15.

Step S6

The CPU 10 predicts a relative speed and a distance with respect to the next measurement from the measured data of the relative speed and the distance stored in the memory 14.

Figure 13:
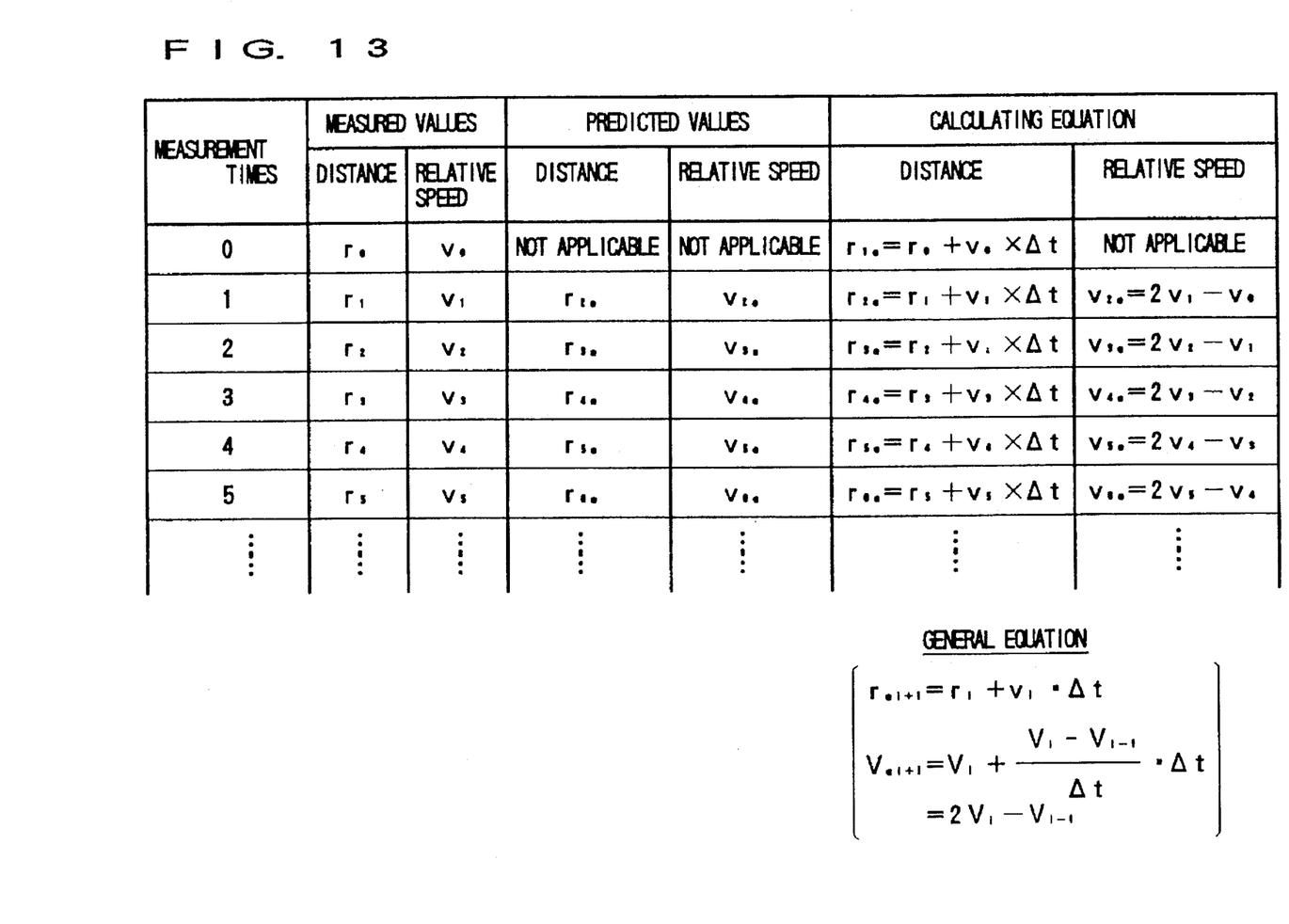
FIG. 13 is a chart illustrating a relationship between measured values and predicted values in the obstacle sensing apparatus according to the present invention.

Calculating equations for predicted values determined from the measured data are given in FIG. 13. Also as given by a general equation in FIG. 13, a predicted distance can be calculated from the last measured distance and measured relative speed by using a sampling time Δt which is a period for executing a flow chart of FIG. 11 at one time. A predicted relative speed can be calculated from the relative speed measured last and the relative speed measured before last by using the sampling time Δt.

Data thus predicted from the measured data shown in FIG. 12A are charted in FIG. 12B. Predicted values for "near" data are included in Prediction ①, predicted values for "middle" data are included in Prediction ②, and predicted values for "far" data are included in Prediction ③. It is to be noted that x marks indicate non-predictable condition.

Step S7

The predicted distance and predicted relative speed as calculated at Step S6 are stored in the memory 14.

Step S8

The measured data and the predicted data in FIGS. 12A and 12B are derived from the memory 14 for the following decision.

Step S9

It is now determined whether or not the measured values of the relative speed in FIG. 12A derived from the memory 14 have a tangential direction (negative direction) and are substantially the same with respect to the car speed as read-in at Step S5.

As a result, if the car speed is 72 km/hour, "near" data and "middle" data the relative speed of which is "−72" indicate a stationary object or a guardrail, and "far" data has a relative speed of "0" so that it is found that "far" data indicate a car (at Step S10). This can also be recognized from the trace T3 in FIG. 9.

Step S11

While the reflecting object has been distinguished between a car and a stationary object other than a car at Step S9, it is then determined whether or not the predicted value has a large difference from the measured value at the same measurement in order to distinguish the stationary object from a guardrail.

That is, in the example of FIGS. 12A and 12B, data "38" in Prediction ① among Predictions ①–③ in FIG. 12A at the second time has no corresponding data to the measured values in FIG. 12A at the second time. Also, there are found no predicted values in Prediction ① at the second time corresponding to "near" data at the second time in the measured values.

On the other hand, data "40" in Prediction ② at the second time coincides with "middle" data "40" in the measured values at the second time, and the predicted value at this time is not much different from the last measured value as shown by the trace T2 in FIG. 9 so that the radio wave reflecting object in this case can be judged as "stationary object" other than a guardrail (at Step S12).

Thus, by using measured distances which are deviated from the predicted values, the reflecting object can be judged as "non-stationary object". This applies to "middle" data "38" in the measured values at the fourth time and "middle" data "40" at the fifth time.

Step S13

Since a guardrail temporarily reveals data similar to a stationary object under some measurement condition, it is necessary to discriminate a stationary object over a guardrail with reference to variations of the measured distance data in the past.

Namely, while data "38" in Prediction ① is much different from "near" data "40" of the measured values in the data at the second time, the predicted value and the measured value at the third time are both "38". This applies not only to Prediction ① but also Prediction ②, that is, "near" data and "middle" data coincide with each other as data "38". By comparison of the measured data with the data at the first, second, third times in the vertical direction, it is found that "near" data is much more constant than "middle" data, so that data "38" at the third time in "near" data can be judged as one for a guardrail (at Step S14).

Figure 14:
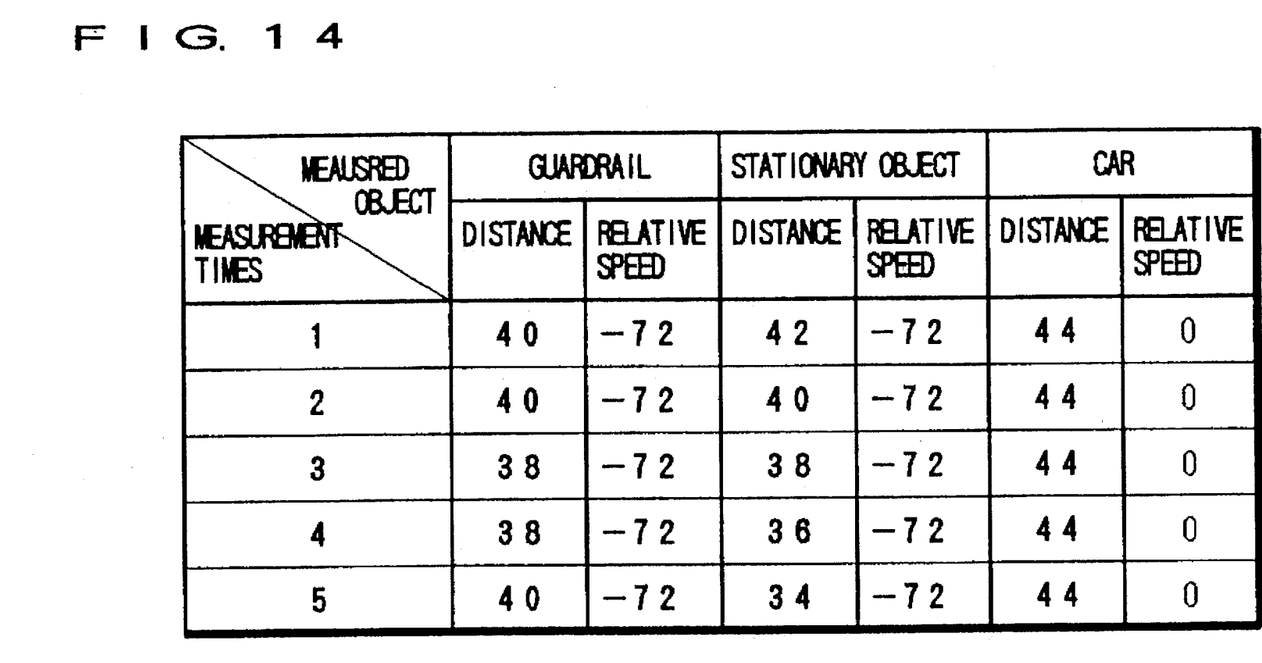
FIG. 14 is a chart illustrating decided results in the obstacle sensing apparatus according to the present invention.

The result thus determined as above is charted in FIG. 14. To relate the data in FIG. 14 with the data in FIG. 12, a guardrail is attached with Δ marks and a stationary object is attached with ○ marks for the discrimination.

According to the present invention, a time required from each measurement to frequency analysis must be an extremely short time because of using the correlation of measured data. However, by development of a high speed CPU and the fact that the number of measurements only requires 3 or 4 times, such a required time can be realized for the degree of several 10 ms. Even if the required time is 100 ms, it is fully practical because it corresponds to a distance for which a car running with a speed of 150 km/h goes ahead only by 4.2 m.

Having described the present invention by way of the preferred embodiment, it can be seen how the objects of the invention have been attained. As this invention may be embodied in several forms without departing from the spirit of the invention, the present embodiment is therefore illustrative and not restrictive since the scope of the invention is defined by the appended claims and includes such equivalent forms as will be apparent to those skilled in the art.

We claim:

1. An obstacle sensing apparatus wherein an FM-CW wave is emitted, a received wave from an object reflecting the FM-CW wave is mixed with the emitted wave to produce a beat signal which is analyzed in frequency to measure a distance and a relative speed with respect to the object, said apparatus comprising:

means for sensing an actual car speed;

means for predicting a distance and a relative speed at the next time from the measured distance and relative speed and for determining that the object is a stationary object if the measured relative speed has substantially the same value as the sensed car speed in an approaching direction; and means for determining that the stationary object is at least one of a guardrail and a sound barrier if a difference between the measured distance and the predicted distance exceeds a preset value, and a plurality of the measured distances in the past are substantially the same.

2. An obstacle sensing apparatus according to claim 1, further comprising means for determining that the object is a car if the measured relative speed does not have substantially the same value as the sensed car speed or does not include an approaching direction.

3. An obstacle sensing apparatus according to claim 1, further comprising means for determining that the stationary object is a stationary object other than at least one of a guardrail and a sound barrier if a difference between the measured distance and the predicted distance is less than a preset value.

4. An obstacle sensing apparatus according to claim 1, further comprising means for storing the measured distance and relative speed and the predicted distance and relative speed, said determining means reading out the stored data in said storing means.

5. An obstacle sensing method for use in a vehicle, comprising:

emitting a wave;

receiving a portion of the wave reflected from an obstacle;

measuring a distance and a relative speed with respect to the obstacle based on the emitted wave and the received wave;

sensing a vehicle speed;

generating a predicted distance and a predicted relative speed based on the measured distance and relative speed; and determining that the obstacle is a stationary object if the measured relative speed has substantially the same value as the sensed vehicle speed.

6. An obstacle sensing method according to claim 5, further comprising determining that the obstacle is a vehicle if the measured relative speed does not have substantially the same value as the sensed vehicle speed.

7. An obstacle sensing method according to claim 6, further comprising determining that the stationary object is a stationary object other than a guardrail or a sound barrier if a difference between the measured distance and the predicted distance is less than a preset value.

8. An obstacle sensing method according to claim 7, further comprising determining that the stationary object is either a guardrail or a sound barrier if a difference between the measured distance and the predicted distance exceeds a preset value, and a plurality of preceding measured distances are substantially the same.

9. An obstacle sensing method according to claim 8, further comprising storing the measured distance and relative speed and the predicted distance and relative speed.

* * * * *